(12) United States Patent
Hobson et al.

(10) Patent No.: US 11,339,061 B2
(45) Date of Patent: May 24, 2022

(54) SOLAR WATER PASTEURIZER

(71) Applicants: Garron M. Hobson, Sandy, UT (US); Jeremy VanderDoes, Uintah, UT (US)

(72) Inventors: Garron M. Hobson, Sandy, UT (US); Jeremy VanderDoes, Uintah, UT (US)

( * ) Notice: Subject to any disclaimer, the term of this patent is extended or adjusted under 35 U.S.C. 154(b) by 338 days.

(21) Appl. No.: 16/782,593

(22) Filed: Feb. 5, 2020

(65) Prior Publication Data
US 2021/0238057 A1 Aug. 5, 2021

(51) Int. Cl.
*F24S 20/30* (2018.01)
*C02F 1/02* (2006.01)
*F24S 60/30* (2018.01)
*F24S 80/40* (2018.01)
*F24H 1/18* (2022.01)

(52) U.S. Cl.
CPC ............... *C02F 1/02* (2013.01); *F24H 1/181* (2013.01); *F24H 1/182* (2013.01); *F24S 20/30* (2018.05); *F24S 60/30* (2018.05); *F24S 80/40* (2018.05); *B67D 2210/00013* (2013.01); *C02F 2201/009* (2013.01); *C02F 2303/04* (2013.01)

(58) Field of Classification Search
CPC ........ C02F 1/14; C02F 1/02; C02F 2201/009; C02F 2303/04; F24S 20/30; F24S 80/40; F24S 23/77; F24S 60/30; F24H 1/181; F24H 1/182; B67D 2210/00013; Y02A 20/212; Y02E 10/40
See application file for complete search history.

(56) References Cited

U.S. PATENT DOCUMENTS

| 4,162,029 | A | * | 7/1979 | Gottsegen | ................. F25D 3/08 222/131 |
|---|---|---|---|---|---|
| 8,960,183 | B2 | | 2/2015 | Husson, Jr. | |
| 9,377,215 | B2 | | 6/2016 | Sherwin | |
| 10,222,094 | B2 | | 3/2019 | Sherwin | |
| 2007/0187435 | A1 | * | 8/2007 | Quirk | ................... B67D 3/0083 222/481 |
| 2009/0133688 | A1 | * | 5/2009 | La | ........................... F24S 20/30 126/681 |
| 2012/0022236 | A1 | | 6/2012 | Lobb et al. | |
| 2013/0118995 | A1 | | 5/2013 | Hawkins, II et al. | |
| 2013/0180931 | A1 | | 7/2013 | Owen | |

OTHER PUBLICATIONS

Solar Solutions, LLC, "AquaPak Solar Water Pasteurizer," https://www.solarcleanwatersolution.com/products.html., 2 pgs. Accessed: Sep. 2019.
Gosun, "Portable Solar Oven," https://www.gosun.co/products/go., 8 pgs. Accessed: Sep. 2019.

(Continued)

*Primary Examiner* — Alfred Basichas
(74) *Attorney, Agent, or Firm* — Thorpe, North & Western, LLP (57) ABSTRACT

A solar water pasteurizer has a water jug removably disposed in a solar box with insulation and a solar window. The water jug has a lid to close an aperture in the solar box and a handle thermally isolated from the water jug to facilitate handling of the water jug with heated water. Multiple water jugs can be swapped in and out of the solar box. The solar box also has a thermal mass to preserve some heat in the solar box.

20 Claims, 9 Drawing Sheets

(56) References Cited

OTHER PUBLICATIONS

SCI, "SunRocket," https://solarcooking.fandom.com/wiki/SunRocket. 1 pg. Accessed: Sep. 2019.
Puralytics, "SolarBag," http://www.puralytics.com/html/solarBag.php, 2 pgs. Accessed: Sep. 2019.
Jamebi, "The Solar Revolution in Safe Drinking Water," http://jamebi.com/services/, 8 pgs. Accessed: Sep. 2019.
Technology Exchange Lab, "SunRay 1000 Solar Water Pasteurizer," https://www.techxlab.org/solutions/safe-water-systems-sunray-1000-solar-pasteurizer, 3 pgs. Accessed: Sep. 2019.
Solar Cookers International Network, "A Summary of Water Pasteurization Techniques," http://www.solarcooking.org/pasteurization/solarwat.htm, 7 pgs. Accessed: Sep. 2019.
blazingtubesolar.com., "Sol*Saver Water Pasteurizer," http://www.blazingtubesolar.com/pb/wp_85cb9aa0/wp_85cb9aa0.html, 1 pg. Accessed: Sep. 2019.
Technology Exchange Lab, "SunRay30 Portable Water Pasteurizer," https://www.techxlab.org/solutions/safe-water-systems-sunray-30-portable-pasteurizer, 3 pgs. Accessed: Sep. 2019.
SCI, "Solar Cooking wiki, CooKit," https://solarcooking.fandom.com/wiki/CooKit. 18 pgs. Accessed: Sep. 2019.
SCI, Solar Cooking Wiki, How Solar Cookers Work, https://solarcooking.fandom.com/wiki/SolBuddy, 5 pgs. Accessed: Sep. 2019.
Solvatten, "Technology and the Sun Connect and make Clean Water for the World," https://solvatten.org/what-is-solvatten/, 7 pgs. Accessed: Sep. 2019.
SCI, "Colar Cooking Wiki, Solvatten," https://solarcooking.fandom.com/wiki/Solvatten, 6 pgs. Accessed: Sep. 2019.
Solar Cookers International Network, "A Summary of Water Pasteurization Techniques," http://www.solarcooking.org/pasteurization/solarwat.htm, 8 pgs.
SCI, "Solar Cooking Wili, Water Pasteurization," https://solarcooking.fandom.com/wiki/Water_pasteurization. 7 pgs. Accessed: Sep. 2019.
University of Hawaii, Hilo, "Solar Pasteurization Project," https://hilo.hawaii.edu/academics/cafnrm/faculty/furutani/Solarproject.php, 9 pgs. Accessed: Sep. 2019.
Sustainable Sanitation and Water Management Toolbox, "Solar Pasteurization," https://sswm.info/sswm-solutions-bop-markets/affordable-wash-services-and-products/affordable-water-supply/solar-pasteurisation, 16 pgs. Accessed: Sep. 2019.
World Health Organization, Results of Round 11 of the WHO International Scheme to Evaluate Household Water Treatment Technologies (2019). https://www.solarcleanwatersolution.com/uploads/7/6/6/76662927/world_health_org_results.pdf.
Menon Group, "Optics for Energy Fall 2019" (2019) https://nanoptics.wordpress.com/optics-for-energy-fall-2019/.
SCI Solar Cookers International, "Solar Cooking Wiki," Mar. 2018 https://solarcooking.fandom.com/wiki/Water_pasteurization.

* cited by examiner

SOLAR WATER PASTEURIZER

BACKGROUND

Two billion people globally lack access to safely managed drinking-water services, and approximately 485,000 diarrhoeal deaths in low- and middle-income countries each year are attributable to unsafe drinking-water. World Health Organization, Results of Round II of the WHO International Scheme to Evaluate Household Water Treatment Technologies (2019) (https://www.solarcleanwatersolution.com/uploads/7/6/6/676662927/world_health_org_results.pdf). In addition, one in six people have no access to clean drinking water, and 80% of deaths in children are due to contaminated water. Menon, Rajesh, Optics for Energy (https://nanoptics-.wordpress.com/optics-for-energy-fall-2019/).

Contrary to common belief, biologically-contaminated water does not need to be boiled to make it safe to drink; it only needs to be brought to a temperature that is sufficient to kill all disease-causing organisms. This is known as water pasteurization. Because the pasteurization temperature is much lower than the boiling temperature, pasteurization results in significant fuel savings when compared to boiling. Solar Cookers International (March 2018) (https://solar-cooking.fandom.com/wiki/Water_pasteurization). Solar pasteurization is the moderate use of heat to kill disease-causing microbes in water. It is not necessary to boil water; simply heating water to 65 C (149 F) for one minute kills 99.999% of bacteria in water. See Menon.

Solar disinfection inactivates microorganisms through a combination of UV irradiation, visible light radiation and heat. The UV irradiation damages nucleic acids, thus impairing their ability to replicate. Meanwhile, photosensitive molecules in the water absorb the visible light, resulting in oxidative activities that damage cell structures. The exposure to sunlight also results in temperature increases that denature proteins within the microorganisms and/or cause oxidative damage associated with dissolved oxygen products and heat.

The effectiveness of solar disinfection depends on the sun's intensity, which is affected by weather conditions, time of year, and geographical location. Solar disinfection is most effective in tropical or subtropical regions of up to 35 degrees latitude but can be used anywhere the sun shines.

A variety of solar disinfection technologies are available, including dark/opaque containers that rely on heat from the sun to disinfect water; clear polyethylene terephthalate (PET) containers that rely on the combined action of UV radiation, oxidative activity associated with dissolved oxygen and heat; or combinations of these effects in other types of containers, such as UV-penetrable bags and panels. World Health Organization, Results of Round II of the WHO International Scheme to Evaluate Household Water Treatment Technologies (2019) (https://www.solarcleanwatersolution.com/uploads/7/6/6/6/76662927/world_health_org_results.pdf).

Challenges facing solar water pasteurization include: determining whether pasteurization has been achieved; what temperature has been achieved; portability and the ability to locate water where needed; convenient use; intuitive use; and handling of hot pasteurized water. The improvement of solar water pasteurization is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, sizes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Furthermore, the described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

EXAMPLE EMBODIMENTS

An initial overview of technology embodiments is provided below and specific technology embodiments are then described in further detail. This initial summary is intended to aid readers in understanding the technology more quickly but is not intended to identify key or essential features of the technology nor is it intended to limit the scope of the claimed subject matter.

The invention presents a solar powered water pasteurizer for pasteurizing water. The pasteurizer utilizes solar energy to raise the temperature of a volume of water to a safe temperature for a safe time period. For example, the pasteurizer can raise the water temperature to at least 55° C. for over three hours in one aspect, at least 60° C. for at least two hours in another aspect, at least 65° C. for at least an hour in another aspect, or at least 70° C. for at least 0.1 hour in another aspect. As another example, the pasteurizer can raise the water temperature to between 55-70° C. (130-160° F.) for between 0.1-3+ hours, in another aspect.

The pasteurizer comprises a solar box with an insulated perimeter and a solar window to allow solar energy into the solar box. The solar box can be configured to trap solar energy as heat. An interior of the solar box can be configured to absorb solar energy. In one aspect, the interior of the solar box can be a flat black color. Solar energy passes through the solar window and is mostly trapped within the solar box as heat. At least one water jug is selectively disposable in the solar box to be heated. The exterior of the water jug can also be configured to absorb solar energy. In one aspect, the exterior of the water jug can be a flat black color.

The pasteurizer utilizes a thermal mass and an insulated enclosure to conserve and maintain thermal energy during cooler and non-sunlight conditions, such as at night or when cloudy, to maintain at least some thermal energy and pre-warm a volume of water; thus providing a thermal boost. The thermal mass can have a mass at least as great as the mass of the water. In one aspect, the thermal mass can comprise water. An insulated door can selectively cover the solar window during cooler and non-sunlight conditions, such as at night or when cloudy, to help maintain the thermal energy and resist decrease in the water temperature.

In addition, the pasteurizer provides an external handle that is thermally isolated from the water jug. Thus, the handle allows the water jug to be more easily handled and manipulated. The water jug can reach a temperature of 55-70° C. (130-160° F.). Water at a temperature of 90° C. (140° F.) can cause $3^{rd}$ degree burns in 5 seconds. Thus, the handle allows the heated water jug with pasteurized water to be removed from the solar box while at elevated temperature without burning the remover.

In addition, multiple water jugs can be provided allowing one water jug to be heated in the solar box, another water jug to be cooling, and another water jug to be utilized providing water. Thus, the pasteurizer can provide a hot-swap feature to allow different jugs of water to be simultaneously heated, cooled and used. In addition, a carrier with multiple, travel-sized vessels, can be removably disposed in the solar box. Thus, the travel-sized vessels can be both used in pasteurization and used to facilitate transportation of pasteurized water.

Furthermore, the water jugs can have an analog temperature indicator to provide a visual indication of the temperature and progress of the pasteurization process. The temperature indicator can be a mechanical thermometer with a dial that does not utilize power, such as a battery. Thus, the pasteurizer and the analog temperature indicator can be used in remote and undeveloped areas.

Referring to FIGS. 1-8, a solar powered water pasteurizer 10 is shown by way of example. The pasteurizer 10 comprises at least one water jug 14 removably disposed in a solar box 18. In one aspect, the pasteurizer 10 can comprise six water jugs 14, four of which can be disposed in the solar box 18, while the other two are in-use and cooling.

Figures 6, 7:
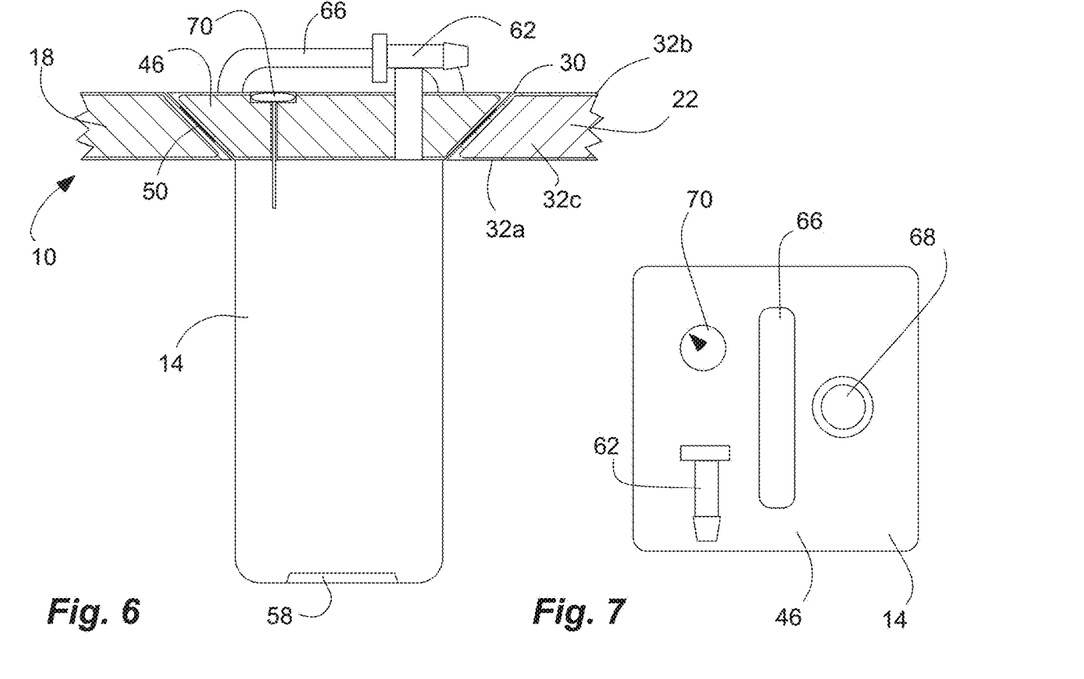
FIG. 6 is a schematic cross-sectional side view of the water jug of the solar powered water pasteurizer of FIG. 1.
FIG. 7 is a schematic top view of the water jug of the solar powered water pasteurizer of FIG. 1.

The solar box 18 can be an insulated enclosure. The solar box 18 can have an insulated wall 22. The insulated wall 22 can form a majority of a perimeter of the solar box 18. In one aspect, the solar box 18 can be substantially rectangular or square with six sides, including a bottom, a top, and lateral sides. The solar box 18 can have an open side in the insulated wall 22 that is closed by a solar window 26. The solar window 26 can form all or part of a lateral side of the solar box 18. The solar window 26 can be at least translucent or transparent to solar energy. In addition, the solar box 18 can have an aperture 30 through the insulated wall 22. In one aspect, the aperture 30 can be through the top of the solar box 18, and the insulated wall 22. In another aspect, the solar box 18 can have four apertures, including front apertures and back apertures, to accommodate four water jugs 14. The insulated wall 22 can form the entire perimeter of the solar box 18 except for the solar window 26 and the aperture(s) 30. As stated above, the solar box 18 and the wall 22 can be insulated. The solar box 18 and the insulated wall 22 can have an interior skin 32a and an exterior skin 32b separated by an insulated layer 32c, as shown in FIG. 6. The wall 22 can comprise plastic with the interior and exterior skins 32a and 32b comprising plastic. The insulated layer 32c can be foam, such as a closed cell foam. In one aspect, the solar box 18 and the insulated wall 22 can be formed by rotational molding, and the skins 32a and 32b and the insulated layer 32c can be formed together during the rotational molding. The skins 32a and 32b can be continuous around an outer surface, an inner surface, and through the aperture 30 of the solar box 18. The insulated wall 22 resists the transfer of heat from the solar box 18. The interior surface of the solar box 18 can have a flat black color to absorb solar energy and heat the solar box 18.

The solar box 18 can also have an insulated door 34 closable over the solar window 26. The door 34 can be pivotally coupled to the solar box 18, such as by a hinge positioned at a bottom edge of the solar box 18 and the door 34. The door 34 can be sized to cover the solar window 26. In one aspect, the door 34 can be one of the lateral sides of the solar box 18. The door 34 can also be insulated and can have an interior skin and an exterior skin separated by an insulated layer. The door 34 can be formed in the same way and can have the same composition as the solar box 18. In addition, a seal 38 can be positioned between the door 34 and the solar box 18 and can be compressed therebetween. The seal 38 can be disposed in a groove, and both the seal 38 and the groove can extend around a perimeter of the solar window 26. In one aspect, the groove and the seal 38 can be carried by the solar box 18. In another aspect, the groove and the seal 38 can be carried by the door 34.

Figure 1:
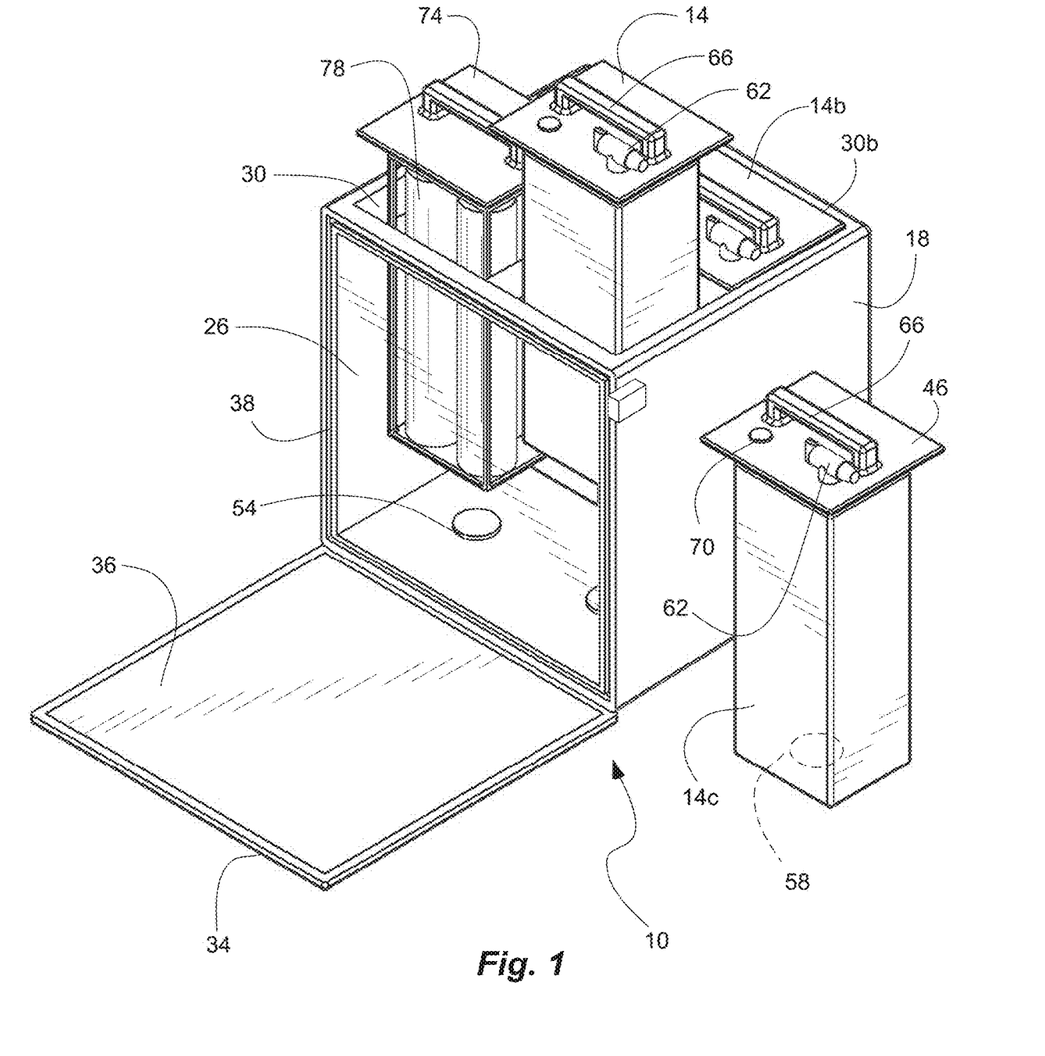
FIG. 1 is a schematic perspective view of a solar powered water pasteurizer in accordance with an embodiment of the invention, showing a solar box in an open configuration, and showing a water jug and a carrier with water vessels being removed or inserted into the solar box, and showing a water jug removed from the solar box.
Figure 2:
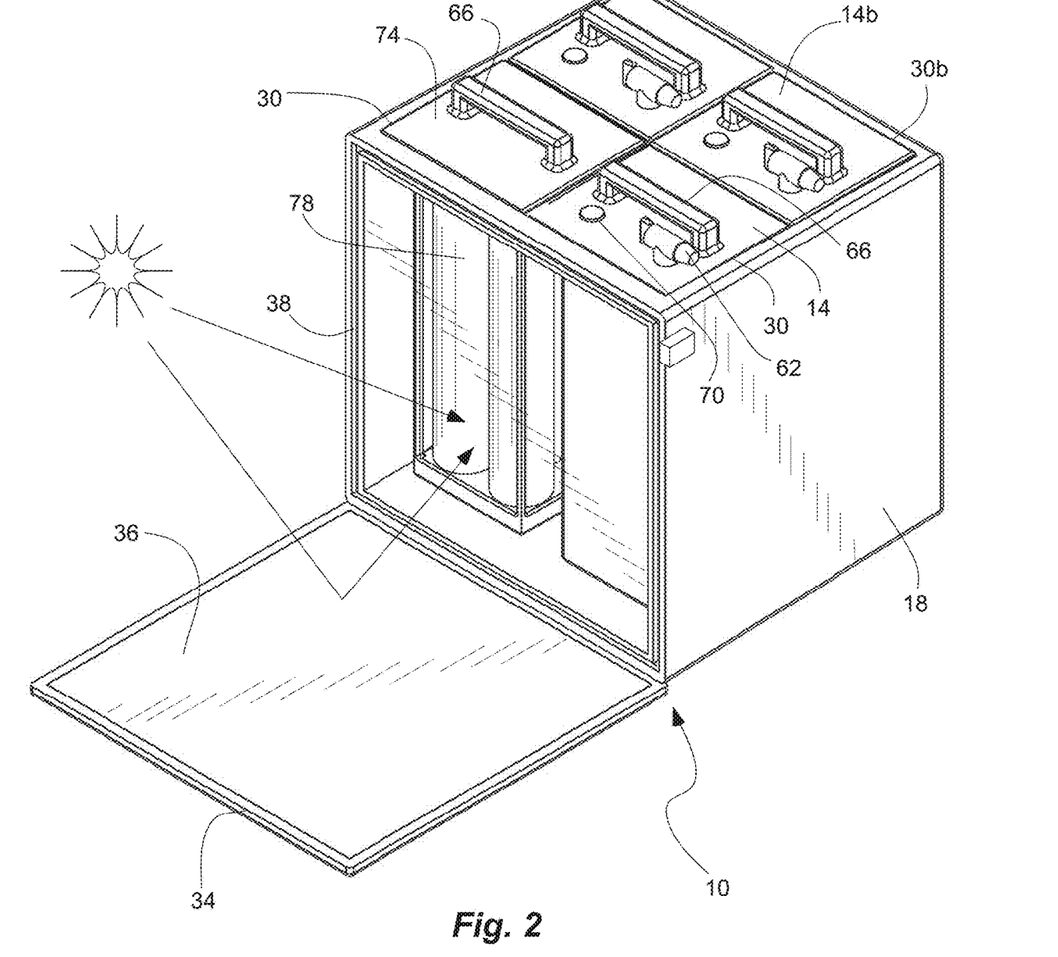
FIG. 2 is a perspective view of the solar powered water pasteurizer of FIG. 1, shown with the water jug and the carrier with the water vessels inserted into the solar box, and with the solar box in the open configuration.
Figure 3:
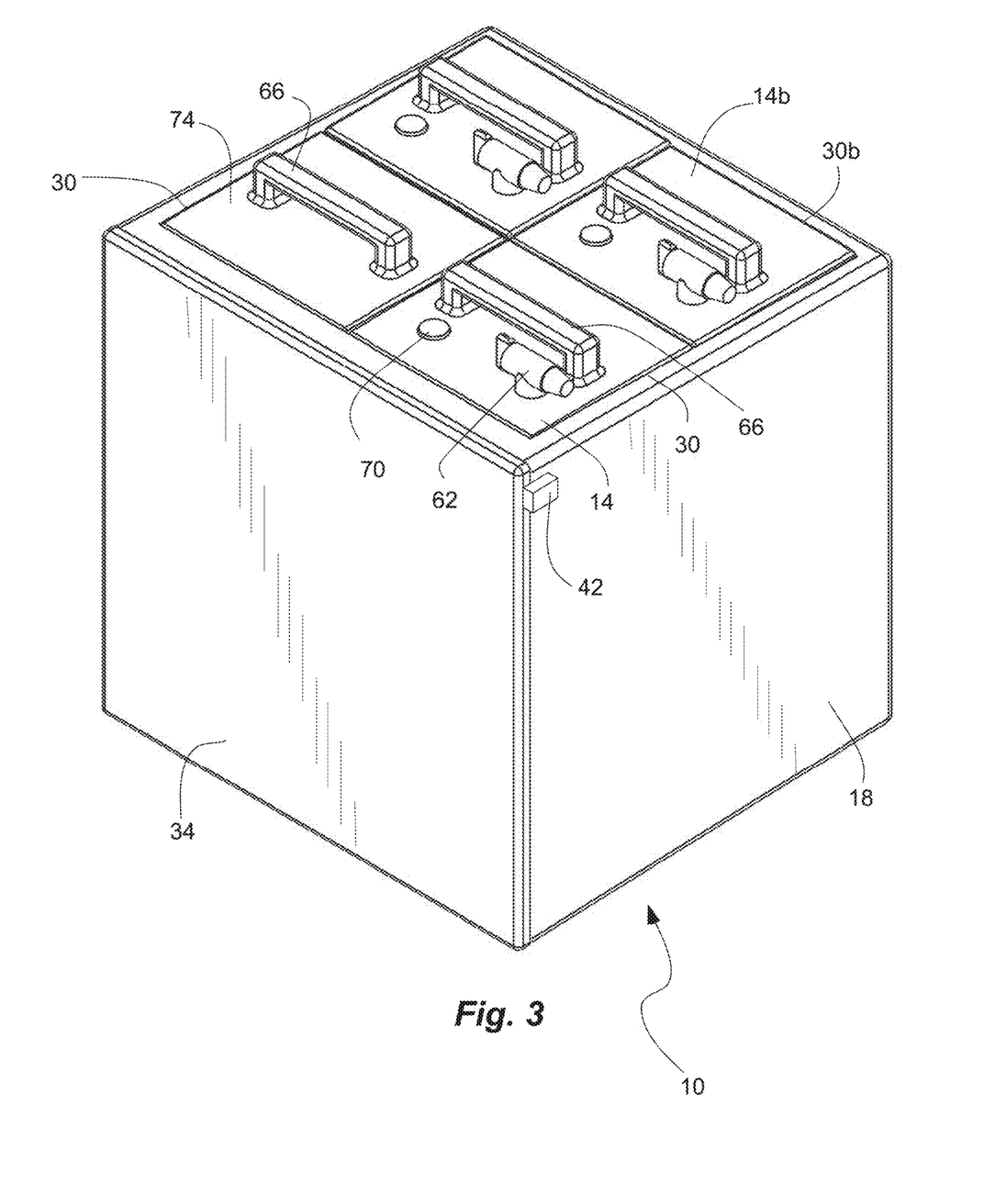
FIG. 3 is a perspective view of the solar powered water pasteurizer of FIG. 1, shown with the water jug and the carrier with the water vessels inserted into the solar box, and with the solar box in a closed configuration.
Figure 4:
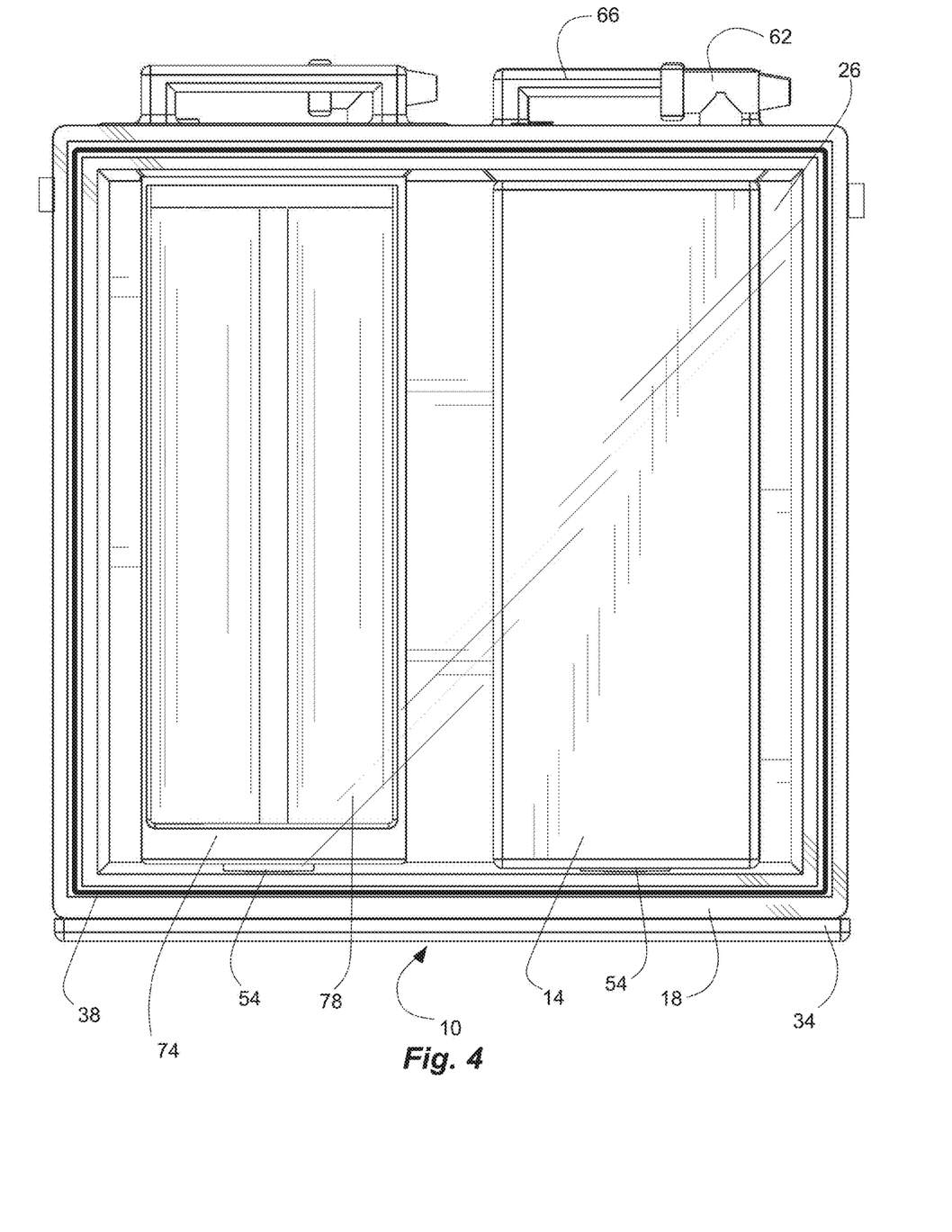
FIG. 4 is a front view of the solar powered water pasteurizer of FIG. 1, 10 shown with the water jug and the carrier with the water vessels inserted into the solar box, and with the solar box in the open configuration.
Figure 5:
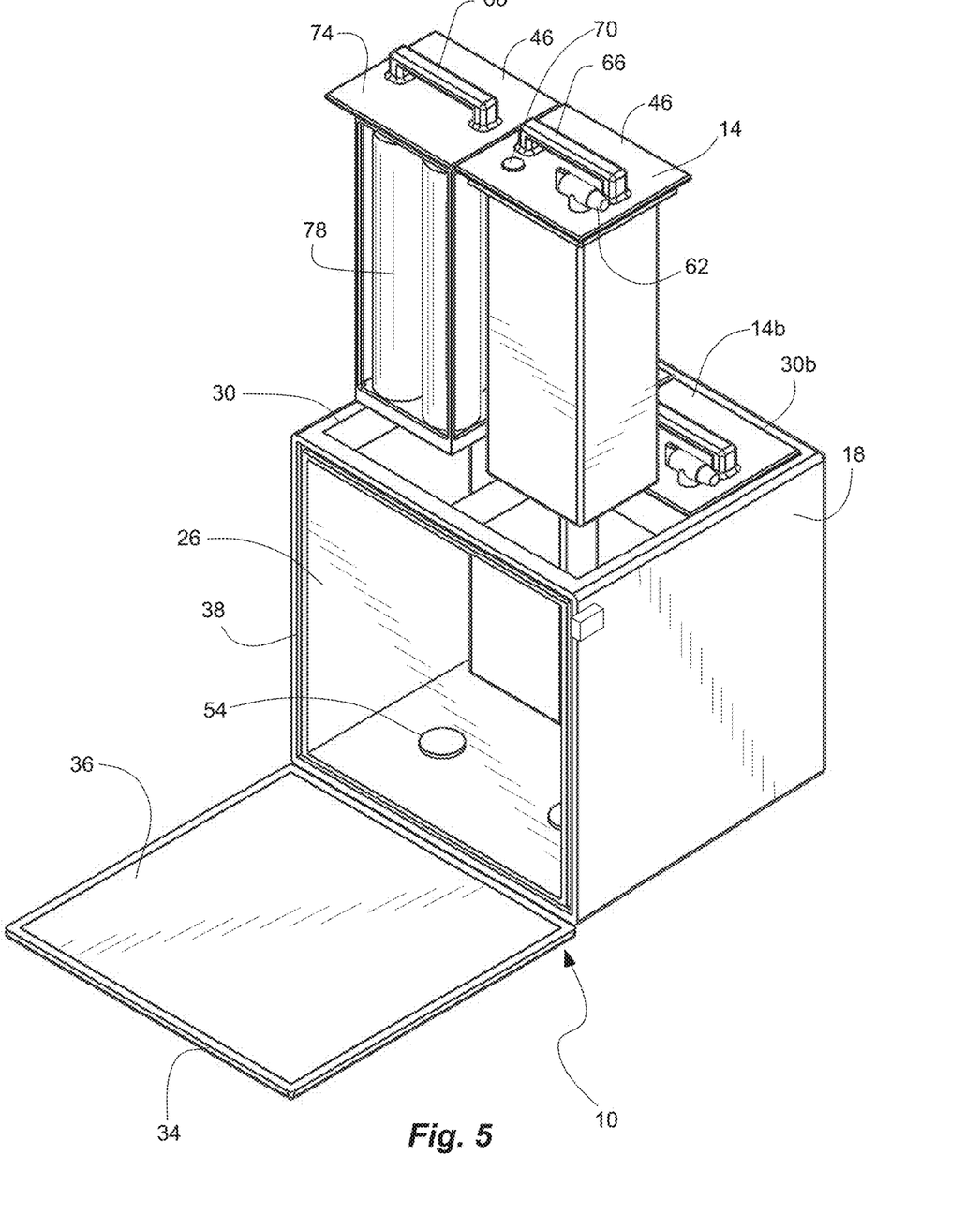
FIG. 5 is a perspective view of the solar powered water pasteurizer of FIG. 1, shown with the water jug and the carrier with the water vessels removed from the solar box, and with the solar box in the open configuration.

The solar box 18 and the door 34 can have at least two configurations, including: an open configuration (FIGS. 1, 2, 4 and 5) and a closed configuration (FIG. 3). In the open configuration, the door 34 is away from the solar window 26 to expose the solar window. In one aspect, the inside of the door 34 can have a reflective surface 36 to reflect sunlight into the solar window 26. In the closed configuration, the door 34 is disposed over the solar window 26, and the seal 38 is compressed therebetween. A latch 42 can secure the door 34 to the solar box 18 in the closed configuration. In another aspect, additional reflectors can be positioned around the solar window 26 during use, and in the open configuration, to reflect additional solar energy through the solar window 26 and into the solar box 18. In one aspect, the additional reflector can be pivotally coupled to the door 34 or the solar box 18, and foldable between the door 34 and the solar box 18 and the solar window 26 in the closed configuration.

As stated above, the water jug 14 is removably disposed in the solar box 18. The water jug 14 is insertable through the aperture 30 to place the water jug in the solar box 18. In addition, the water jug 14 is withdrawable through the aperture 30 to remove the water jug from the solar box 18. The water jug 14 can have a width and a lateral dimension smaller than a width and lateral dimension of the aperture 30 to allow the water jug 14 to pass through the aperture 30 and into and out of the solar box 18. In one aspect, the water jug 14 can have a substantially rectangular shape with a substantially square cross-sectional shape. Thus, the water jug 14 can be rotated about a vertical axis in 90-degree increments and inserted through the aperture 30 for ease of insertion. The water jug 14 can have a volume between 1 and 3 gallons in one aspect, between 1.5 and 2.5 gallons in another aspect, and of substantially 2 gallons in another aspect. In one aspect, the water jug 14 can be formed of plastic and can be formed by molding. In another aspect, the water jug 14 can have an external surface that has a flat black color to absorb solar energy and heat in the solar box 18.

Each water jug 14 can have a lid 46 carried by the water jug 14. The lid 46 is sized and shaped to close the respective associated aperture 30. The lid 46 has a size and lateral width larger than the water jug 14 and the aperture 30 to extend beyond a profile of the water jug 14 and the aperture 30. The lid 46 closes the aperture 30 in the solar box 18 when the water jug 14 is disposed in the solar box 18. The lid 46 can be insulated, much like the wall 22 and the door 34. The insulated wall 22, the solar window 26, the insulated door 34, and the lid(s) 46 can form an enclosure with the solar box 18 being enveloped by insulation from the insulated wall 22, the lid(s) 46 and the door 34. The water jug 14 can be affixed to the lid 46.

In one aspect, the water jug 14 can be pendent from the lid 46, and pendent from the top of the solar box 18. The lid 46 of can abut to the top of the solar box 18, with the water jug 14 pendent from the lid 46 in the solar box 18. In another aspect, a seal 50 can be positioned between the lid 46 and the solar box 18. In one aspect, the seal 50 can be carried by the lid 46. In another aspect, the seal 50 can be carried by the solar box 18. The weight of water jug 14, and water therein, presses the lid 46 against the solar box 18, compressing the seal 50 therebetween.

In another aspect, the solar box 18 and the water jug 14 can have a guide between a bottom of the water jug 14 and a bottom of an interior of the solar box 18. The guide can maintain alignment of the lid 46 of the water jug 14 with the aperture 30 in the top of the solar box 18. Thus, the solar box 18 can be tilted so that the solar window 26 can better face the sun without opening the seal 50 between the lid 46 and the solar box 18. In one aspect, the guide can have a protrusion 54 matching and received in an indentation 58 in the water jug 14 and the carrier.

In another aspect, the water jug 14 can have a spigot 62. The spigot 62 can have a stem extending from the water jug 14 and through the lid 46 to a spout with a valve. The water jug 14 can be removed from the solar box 18 and turned on its side to dispense water through the spigot 62.

In addition, the water jug 14 and the lid 46 can have a handle 66 extending from the lid 66 opposite the water jug 14. The handle 66 is separated and thermally isolated from the water jug 14 by the lid 46, which is insulated. Thus, the water jug 14, which can contain heated water, can be easily removed from the solar box 18 and transported and manipulated for use. In one aspect, the handle 66 can be integrally formed with the lid 46 and at the same time as the lid to form an integrated, monolithic handle and lid combination. Thus, the handle can be insulated like the lid, and can have a skin continuous with the lid and filed with insulation continuous with the lid.

In addition, the water jug 14 can have an inlet opening 68 (FIG. 7) closed by a cap. The inlet opening 68 can extend from the water jug 14 and through the lid 46 with the cap positioned at the lid 46. The inlet opening 68 can facilitate filing the water jug 14 with water. In another aspect, the inlet opening can be formed in the water jug on an interior side of the water jug, opposite the handle, to limit and reduce heat transfer paths through the lid.

Furthermore, the water jug 14 and the lid 46 can have an analog temperature gauge 70 with a face located at the lid 46 and a sensor disposed in the water jug 14. The gauge 70 can be a mechanical thermometer with a dial face located at the lid 46, and a stem extending therefrom into the water jug 14. Thus, the gauge 70 can indicate the temperature and progress of the pasteurization process without using batteries or other power sources. A pointer can be movable in the dial face and coupled to a sensor in the stem. The sensor can be a strip of metal that changes shape and orientation under temperature changes to pivot the pointer. The gauge 70 and the dial face thereof can have indicia to indicate the different temperatures of the water, and the desired pasteurized temperature of the water, when indicated by the pointer. The indicia can include a smiley face and a green color corresponding to the desired pasteurization temperature, e.g. at about 65° C. and 150° F. Similarly, the indicia can include a frowny face and a red color corresponding to temperatures less than the desired pasteurization temperature. The indicia can also be graduated to indicate that progress is being made in the temperature. For example, the indicia can include a yellow color between the red and green colors to demonstrate that pasteurization is imminent. In one aspect, the face of the temperature gauge 70 can be recessed in a surface of the lid 46 to protect the face. The analog nature of the gauge 70 can demonstrate the progress made in the pasteurization process. The mechanical nature of the gauge 70 can facilitate operation without a power source, such as in remote and undeveloped areas.

The pasteurizer 10 and the solar box 18 can also have a thermal mass located in an interior of the solar box 18. The thermal mass can absorb and retain thermal energy and heat while the solar window 26 is exposed to solar energy, such as during the day, and then slowly release the stored thermal energy and heat, such as during the night. Thus, the thermal mass can be used to raise or maintain a temperature of the water in the water jugs 14 during the night or in the morning. In addition, the thermal mass can provide a thermal boost to jump start the pasteurization process in the morning. The thermal mass can comprise water, concrete, clay, bricks, mud, dirt, earth, stone, etc. In one aspect, the thermal mass can have a mass at least as great as a mass of the water in the water jug(s) when filled.

In one aspect, at least one of the water jugs 14 can be utilized as the thermal mass. For example, the pasteurizer 10 can have a front water jug 14, or a pair of front water jugs 14, located closer to the solar window 26, that can be used for pasteurized water for drinking. Thus, the aperture 26 can be front apertures 30 located closer to the solar window 26. In addition, the pasteurizer 10 can have a back water jug 14b, or a pair of back water jugs 14b, removably disposed in the solar box 18 further from the solar window 26, that can be used for the thermal mass. The back water jugs 14b can be insertable and removable from the solar box 18 through back apertures 30b further from the solar window 26. The back water jug(s) 14b can be utilized as, and can define, the thermal mass, while the front water jug(s) 14 can be utilized for providing pasteurized water. In one aspect, the back water jug(s) 14b can be used as a source of back-up or emergency pasteurized water, such as when additional pasteurized water is needed in addition to the front water jug(s) 14.

In another aspect, multiple water jugs 14 can be provided for enhanced usability. For example, a pair of water jugs 14 can be separately disposable in the solar box 18 through the aperture 30 with one water jug 14 disposable in the solar box 18 for pasteurization, and the other water jug 14c disposable outside the solar box 18 for use. As another example, one pair of water jugs 14 can be pasteurizing and disposed in the solar box 18; while another pair of water jugs 14c can be cooling, such as disposed in the shade; while another pair of water jugs 14c can be utilized for water, such as oriented horizontally and disposed in a dwelling; while another pair of water jugs 14b can be disposed in the solar box 18 for use as the thermal mass. The water jugs can be swappable in the solar box 18. The lids 46 and the handles 66 allow the water jugs 14 (and the carrier 74 with vessels 78) to be quickly and easily swapped, and reduce heat loss from the solar box 18.

The pasteurizer 10 can also have a carrier 74 that is similar in many respects to the water jug 14. The carrier 74 removably carries a plurality of water vessels 78 that are removable from the carrier 74 and transportable from the pasteurizer 10 and the solar box 18. The vessels 78 can have a smaller volume than the water jugs 14. In one aspect, the vessels 78 can have a volume between 1 and 2 liters. Like the water jugs 14, the carrier 74 and the vessels 78 are removably disposed in the solar box 18, and insertable and removable from the solar box 18 through the aperture 30. Similarly, the carrier 74 can have a lid 46 and a handle 66. The carrier 74 and the vessels 78 can be substituted or one or both of the water jugs 14 in the pasteurizer 10. The smaller volume of the vessels 78 facilitate transportation and allows pasteurized water to be easily transported to locations remote from the pasteurizer 10, such as school and work.

Referring to FIG. 6, the aperture 30 of the solar box 18 and the lid 46 of the water jug 14 can be configured to align the water jug 14 in the solar box 18 and to provide a thermal seal. In one aspect, the aperture 30 can be tapered, and the lid 46 can be tapered to match the aperture. In one aspect, the taper can be 45 degrees. The taper can circumscribe the aperture 30 and the lid 46. The taper can guide and self-center the water jug 14 in the aperture 30 while also suspending the water jug 14 pendent from the top of the solar box 18. The seal 50 can be positioned between the lid 46 and the aperture 30 and compressed therebetween. In one aspect, the lid 46 can have a channel to carry the seal 50. In another aspect, the aperture 30 can have a channel therein to carry the seal 50. The seal 50 can be compressed between the lid 46 and the solar box 18 with the weight of the water of the water jug 14 maintaining the compression.

Figure 8:
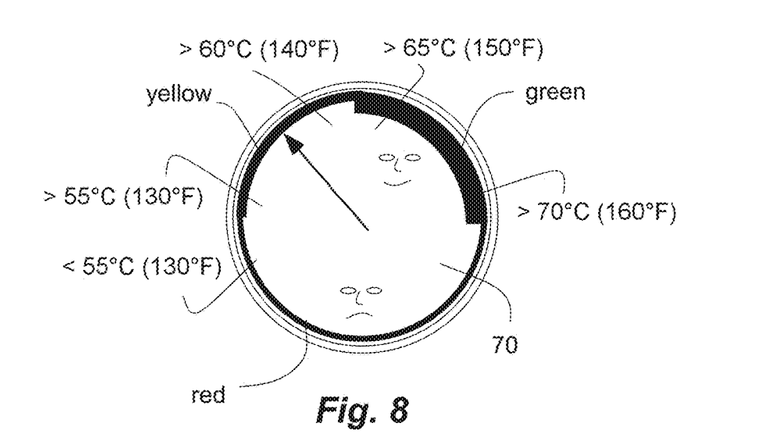
FIG. 8 is a schematic top view of an analog temperature gauge of the solar powered water pasteurizer of FIG. 1.

Referring to FIG. 8, the analog temperature gauge 70 and the face thereof can have indicia indicating the safe temperature and pasteurization. The indicia can comprise colors (such as red, yellow and green), icons (such as smiling and frowning faces), temperatures, and combinations thereof. Because of the analog needle, the progress of the pasteurization process can be observed.

Figure 9:
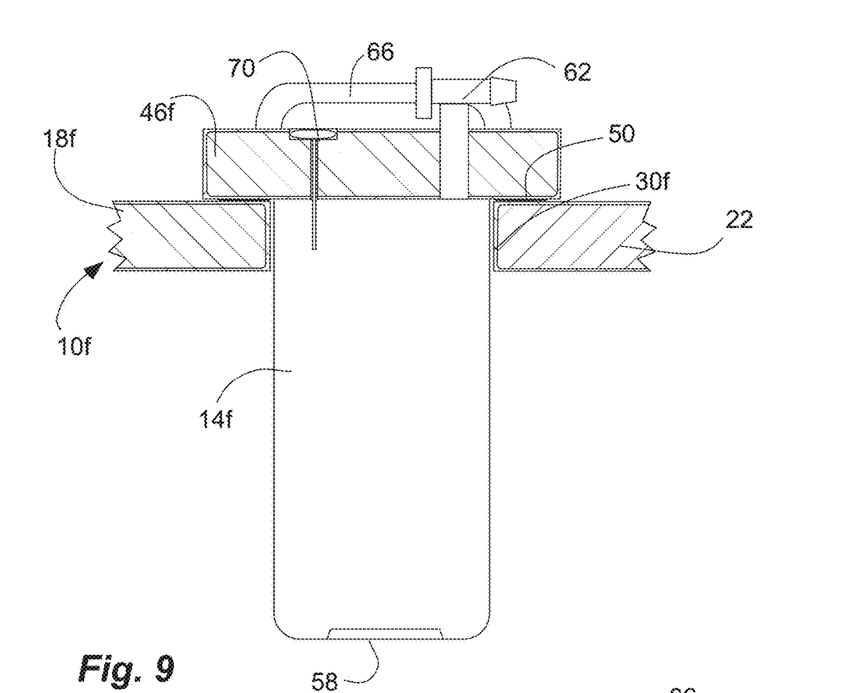
FIG. 9 is a schematic cross-sectional side view of another water jug of another solar powered water pasteurizer in accordance with another embodiment of the invention.

Referring to FIG. 9, another configuration of the lid 46f of the water jug 14f and the aperture 30f of the solar box 18f is shown for another pasteurizer 10f. The lid 46f of the water jug 14f can abut to and rest on the top of the solar box 18f. Such a configuration may be easier to fabricate than the taper.

Figure 10:
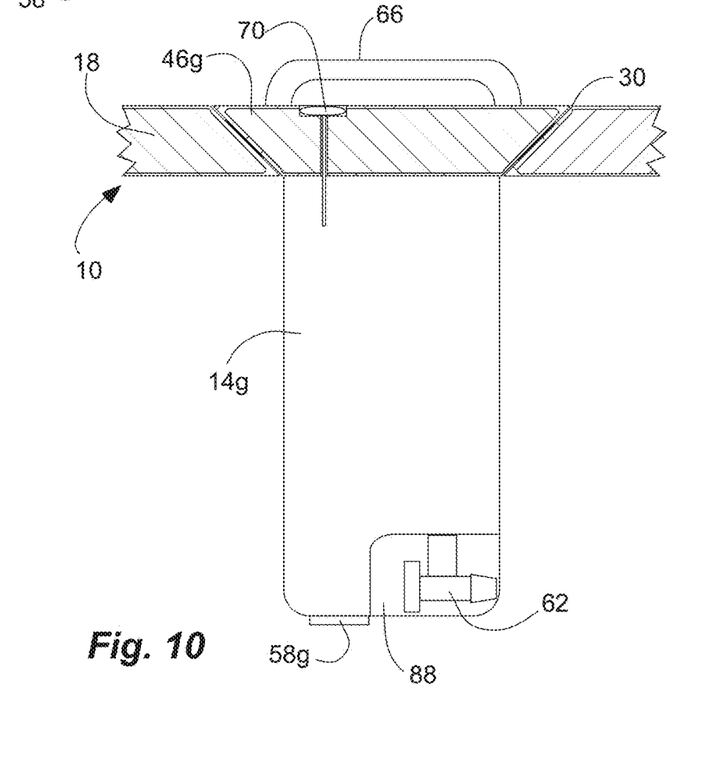
FIG. 10 is a schematic cross-sectional side view of another water jug of another solar powered water pasteurizer in accordance with another embodiment of the invention.

Referring to FIG. 10, another configuration of the water jug 14g is shown. The spigot 62 can be positioned on the bottom of the water jug 14g. The water jug 14g can have an indentation or pocket 88 to receive the spigot 62 in a profile of the water jug 14g. Positioning the spigot 62 on a bottom of the water jug reduces a thermal escape through the lid 46g of the water jug 14g. In addition, positioning the spigot 62 away from the top of the water jug 14g positions the spigot 62 in the solar box 18 during pasteurization, and thus subjects the spigot 62 to the heat of the solar box 18 to pasteurize water and material that contacts the spigot 62. The water jug 14g can also have an inlet opening 68g positioned away from the top of the water jug 14g, such as on the bottom, to further reduce thermal escape.

A method for pasteurizing water, and for using the pasteurizer 10 described above, can comprise:

1) placing a thermal mass in the solar box 18, such as by filing one of the water jugs 14b with water and placing the water jug 14b in the solar box;

2) filling a water jug 14 with contaminated or questionable water;

3) placing the water jug 14 in the solar box 18 by inserting the water jug 14 through the aperture 30 in the top of the solar box 18 with the lid 46 closing the aperture 30;

4) opening the door 34 of the solar box 18;

5) facing the solar window 26 of the solar box towards the sun;

6) waiting for the solar energy to raise the temperature of the water in the water jug 14 in the solar box 18, thus pasteurizing the water and defining a heated pasteurized water jug 14c; and waiting for the solar energy to raise the temperature of the thermal mass in the solar box, or the water in the water jug 14b;

7) filling another water jug 14 with contaminated or questionable water, defining a new water jug;

8) swapping the new water jug 14 with the heated pasteurized water jug 14c in the solar box 18 by removing the heated pasteurized water jug 14c and inserting the new water jug 14;

9) placing the heated pasteurized water jug 14c to cool away from the solar energy, such as in the shade; and waiting for the pasteurized water in the heated pasteurized water jug 14c to cool; and 10) closing the door 34 of the solar box 18 while leaving the water jugs 14 in the solar box 18, and while leaving the lids 46 covering the apertures 30 in the solar box 18, and while leaving the thermal mass or the water jugs 14b in the solar box 18.

The method can further comprise moving the pasteurized water jug 14c into a dwelling after cooling, defining a cooled pasteurized water jug. The cooled pasteurized water jug can be oriented horizontally and the water can be selectively dispensed through the spigot 62.

The method can also comprise viewing a temperature of the water in the water jugs 14 by viewing the temperature indicator 70. The method can also comprise selectively dispensing pasteurized water through the lid 46 and through the spigot 62. The method can also comprise tilting the solar box 18 at an acute angle with respect to the ground or horizontal to further face the solar window 26 towards the sun, and with the guide 54 and 58 maintaining the alignment of the water jug 14 in the aperture 30 and in the solar box 18, and to maintain the lid 46 closing the aperture 30 of the solar box 18. The method can also comprise orienting the door 34 and the reflective surface 36 thereof with respect to the sun and the solar window 26 to direct more solar energy through the solar window 26. The method can further comprise placing and orienting further reflectors adjacent the solar window 26 to further direct solar energy therein.

The method can also comprise filling the vessels 78 with contaminated or questionable water; placing the vessels 78 in the carrier 74, and placing the carrier 74 with the vessels 78 in the solar box 18 with the lid 46 closing the aperture 30. The carrier 74 with the vessels 78 can be removed from the solar box 18 after pasteurization; and the vessels 78 can be removed from the carrier 74 and transported away from the carrier 74 and the solar box 18. Thus, the vessels 78 provide portable pasteurized water.

Referring to FIGS. 11-14, operation of the pasteurizer 10 was simulated to demonstrate effectiveness in two different operating conditions, namely North America at 40 degrees latitude in March, and Africa at 0 degrees latitude in June. For North America, conditions were estimated to be 10 hours of sun per day, an initial water temperature of 40° F., 1700 W/m$^2$ maximum power from the sun, a parabolic power curve through the solar window 26 in the 10 hour time span, and a nightly temperature between 30-65° F. The parabolic power curve reached from approximately 25 Watts to approximately 280 Watts. For Africa, conditions were estimated to be 12 hours of sun per day, an initial water temperature of 40° F., 1800 W/m$^2$ maximum power from the sun, a parabolic power curve through the solar window 26 in the 12 hour time span, and a nightly temperature between 30-65° F. The parabolic power curve reached from approximately 40 Watts to approximately 350 Watts. In addition, it was assumed that full power came through the solar window 26 while only ⅔ power was reflected from the reflective surface 36. In addition, it was assumed that half of the water (pasteurized) was removed from the pasteurizer 10 at the end of the day and replaced with new water (unpasteurized) at the initial temperature in the morning.

Figure 11:
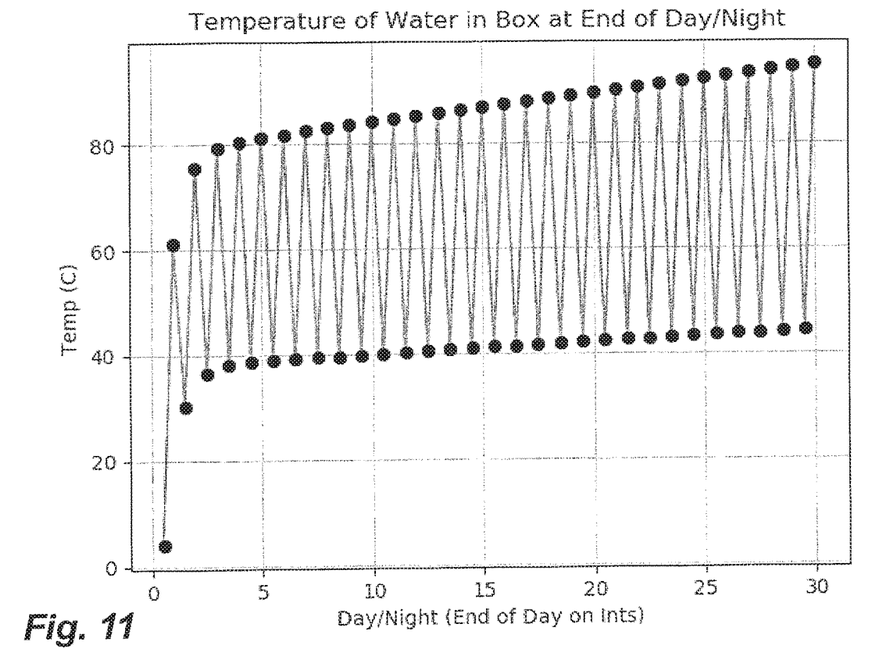
FIG. 11 is a graph of simulated water temperature versus time for the solar powered water pasteurizer of FIG. 1 over a month long period for a location in North America at 40 degrees latitude in the month of March.
Figure 12:
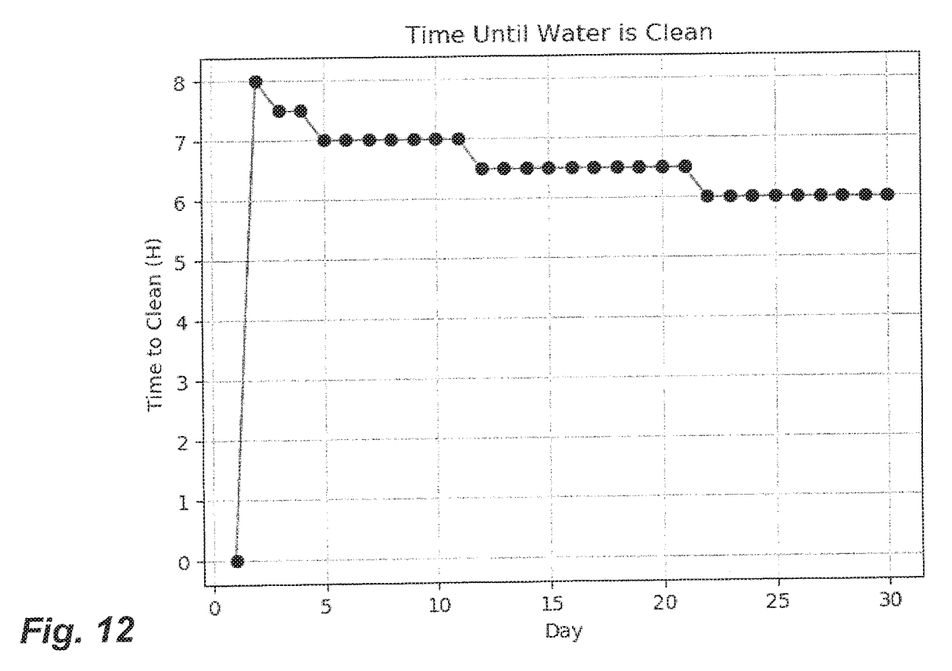
FIG. 12 is graph of calculated time to pasteurize water for the solar powered water pasteurizer of FIG. 1 over a month long period for the location in North America in the month of March.
Figure 13:
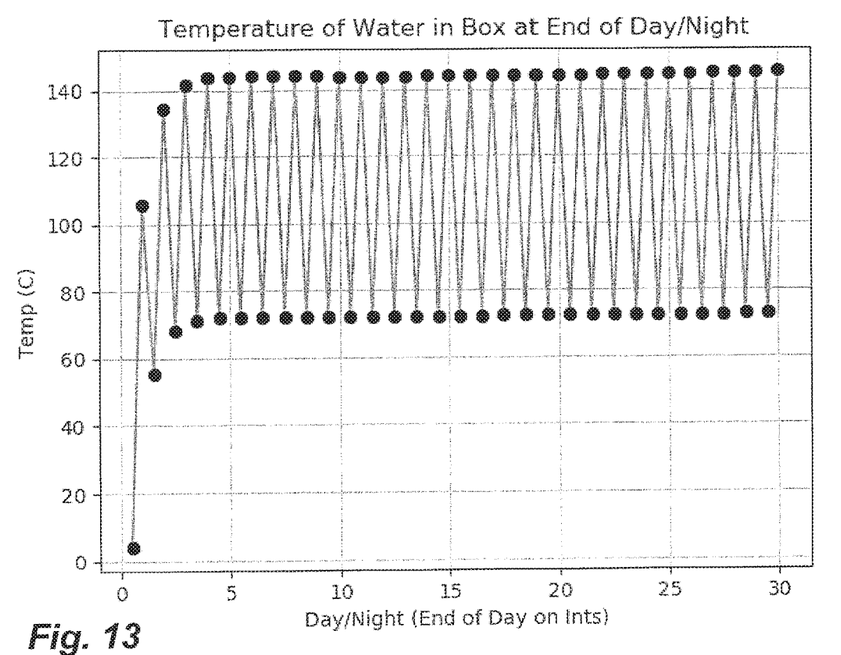
FIG. 13 is a graph of simulated water temperature versus time for the solar powered water pasteurizer of FIG. 1 over a month long period for a location in Africa at 0 degrees latitude in the month of June.
Figure 14:
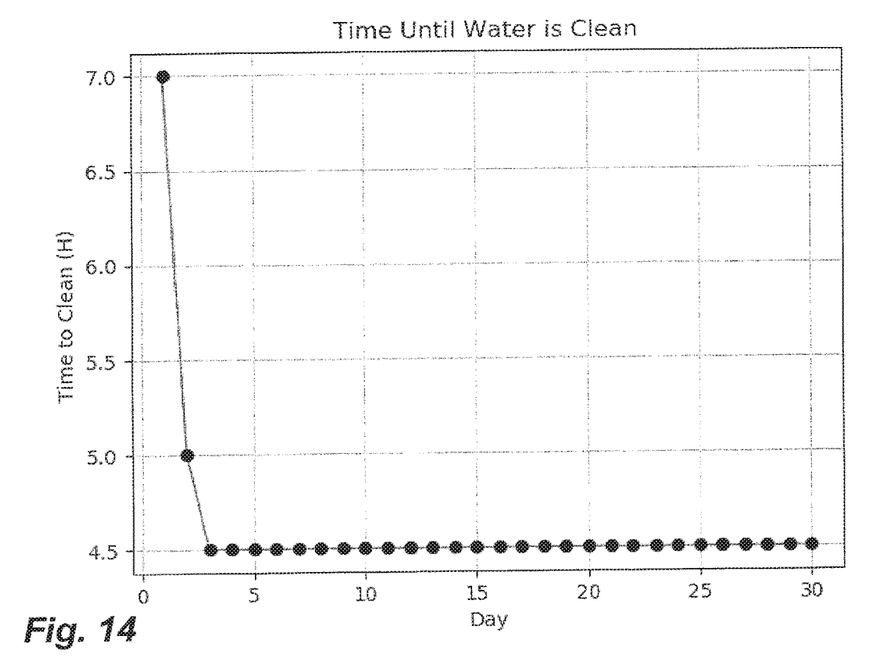
FIG. 14 is graph of calculated time to pasteurize water for the solar powered water pasteurizer of FIG. 1 over a month long period for the location in Africa in the month of June.

FIGS. 11 and 13 demonstrate an exponential temperature curve in which the initial two to three days had lower water temperature as the pasteurizer 10 and the thermal mass came up to temperature. Then, the thermal mass was able to boost the water temperature for subsequent days. The starting water temperature was higher due to the thermal mass. FIGS. 12 and 14 demonstrate that the time to pasteurize the water was decreased. For example, for North America in March, use of the thermal mass was able to decrease the time to pasteurize the water by approximately two hours.

Although the solar pasteurizer has been described above with respect to water, the solar pasteurizer can be utilized to pasteurize other materials and liquids.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A solar powered water pasteurizer, comprising:
   a) a solar box with an insulated wall, a solar window in the insulated wall, and an aperture in a top of the solar box;
   b) a water jug removably disposed in the solar box, and having a width smaller than a width of the aperture to pass through the aperture and into and out of the solar box, and the water jug being pendent in the solar box from the top of the solar box; and
   c) a lid carried by the water jug and having a size larger than the water jug to extend beyond a profile of the water jug, the lid closing the aperture in the solar box when the water jug is disposed in the solar box and with the insulated wall, the solar window and the lid forming an enclosure.

2. The solar powered water pasteurizer in accordance with claim 1, further comprising:
   a spigot extending from the water jug and through the lid.

3. The solar powered water pasteurizer in accordance with claim 1, further comprising:
   a guide between a bottom of the water jug and a bottom of an interior of the solar box to maintain alignment of the lid of the water jug with the aperture.

4. The solar powered water pasteurizer in accordance with claim 3, further comprising:
   a seal positioned between the lid and the solar box; and
   the seal being compressible between the lid and the solar box.

5. The solar powered water pasteurizer in accordance with claim 1, further comprising:
   a handle extending from the lid opposite the water jug; and
   the handle being separated and thermally isolated from the water jug by the lid.

6. The solar powered water pasteurizer in accordance with claim 1, further comprising:
   a thermal mass located in the solar box;
   an insulated door closable over the solar window; and the solar box having at least two configurations, including:
  an open configuration in which the door is away from the solar window to expose the solar window; and
  a closed configuration in which the door is disposed over the solar window, the solar box being enveloped by insulation from the insulated wall, the lid and the door.

7. The solar powered water pasteurizer in accordance with claim 6, further comprising:
   the water jug being a front water jug located closer to the solar window, and the aperture being a front aperture located closer to the solar window; and
   a back water jug removably disposed in the solar box further from the solar window, and insertable and removable from the solar box through a back aperture further from the solar window, the back water jug defining the thermal mass.

8. The solar powered water pasteurizer in accordance with claim 1, further comprising:
   an analog temperature gauge with a face located at the lid and a sensor disposed in the water jug.

9. The solar powered water pasteurizer in accordance with claim 1, wherein the solar box has interior and exterior skins separated by an insulated layer.

10. The solar powered water pasteurizer in accordance with claim 1, further comprising:
    a pair of water jugs separately disposable in the solar box through the aperture with one water jug disposable in the solar box for pasteurization and the other water jug disposable outside the solar box for use.

11. The solar powered water pasteurizer in accordance with claim 1, further comprising:
    a carrier removably disposed in the solar box, and insertable and removable from the solar box through the aperture; and
    a plurality of water vessels removably carried by the carrier.

12. A solar powered water pasteurizer, comprising:
   a) a solar box with an insulated wall, a solar window in the insulated wall, and an aperture through the insulated wall;
   b) a pair of water jugs separately disposable in the solar box through the aperture and swappable in the solar box with one water jug disposable in the solar box for pasteurization and the other water jug disposable outside the solar box for use;
   c) each water jug having an insulated lid with a size larger than the water jug to extend beyond a profile of the water jug, the lid closing the aperture in the solar box when the water jug is disposed in the solar box and with the insulated wall, the solar window and the lid forming an enclosure; and
   d) each water jug having a handle extending from the lid opposite the water jug, the handle being separated and thermally isolated from the water jug by the lid.

13. The solar powered water pasteurizer in accordance with claim 12, wherein each water jug further comprises:
    a spigot extending from the water jug and through the lid.

14. The solar powered water pasteurizer in accordance with claim 12, further comprising:
    the aperture being formed in a top of the solar box; and
    each water jug being pendent in the solar box from the top of the solar box.

15. The solar powered water pasteurizer in accordance with claim 14, further comprising:
    a seal positioned between the lid and the solar box; and
    the seal being compressible between the lid and the solar box.

16. The solar powered water pasteurizer in accordance with claim 12, further comprising:
    a thermal mass located in the solar box;
    an insulated door closable over the solar window; and
    the solar box having at least two configurations, including:
      an open configuration in which the door is away from the solar window to expose the solar window; and
      a closed configuration in which the door is disposed over the solar window, the solar box being enveloped by insulation from the insulated wall, the lid and the door.

17. The solar powered water pasteurizer in accordance with claim 12, wherein each water jug further comprises:
    an analog temperature gauge with a face located at the lid and a sensor disposed in the water jug.

18. The solar powered water pasteurizer in accordance with claim 12, wherein the solar box has interior and exterior skins separated by an insulated layer.

19. A solar powered water pasteurizer, comprising:
   a) a solar box with an insulated wall, a solar window in the insulated wall, and an aperture through the insulated wall;
   b) a water jug removably disposed in the solar box, and having a width smaller than a width of the aperture to pass through the aperture and into and out of the solar box;
   c) a lid carried by the water jug and having a size larger than the water jug to extend, beyond a profile of the water jug, the lid closing the aperture in the solar box when the water jug is disposed in the solar box and with the insulated wall, the solar window and the lid forming an enclosure; and
   d) a spigot extending from the water jug and through the lid.

20. The solar powered water pasteurizer in accordance with claim 19, further comprising:
    the aperture being formed in a top of the solar box; and
    the water jug being pendent in the solar box from the top of the solar box.

* * * * *